July 19, 1938.  O. L. MULLOY  2,124,374
SAFETY VALVE
Filed March 1, 1937
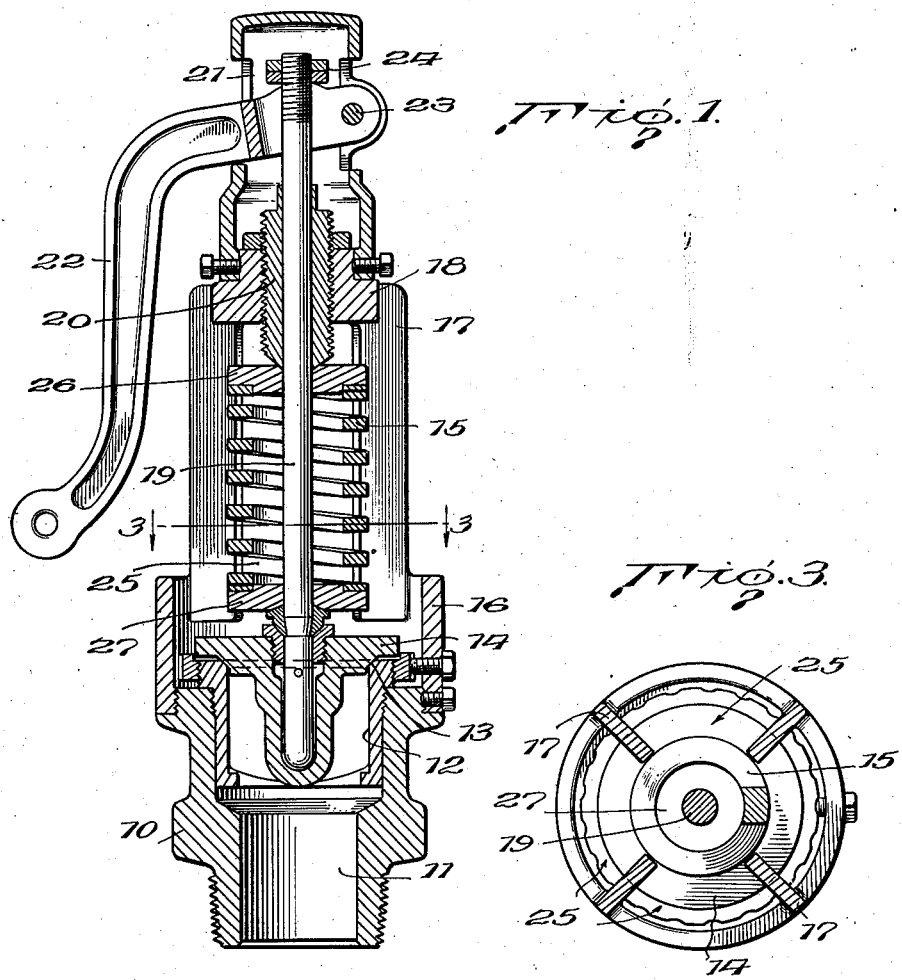
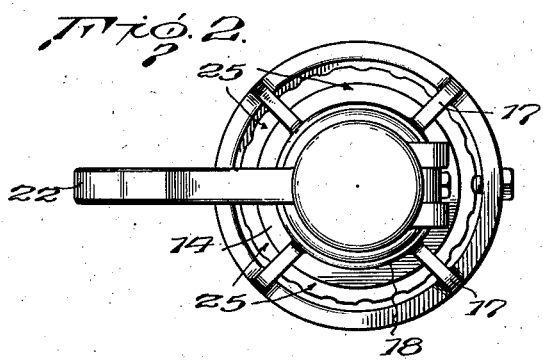
Inventor
Ollie L. Mulloy,
By Church & Church
His Attorneys Patented July 19, 1938

2,124,374

UNITED STATES PATENT OFFICE 2,124,374

SAFETY VALVE

Ollie L. Mulloy, Shreveport, La., assignor to Alva G. Blanchard

Application March 1, 1937, Serial No. 128,502

5 Claims. (Cl. 137—53)

This invention relates to improvements in safety valves and, particularly, to safety valves of the so-called pop-off type used in connection with steam boilers or other vessels containing gases under pressure.

One object of the invention is to provide a safety valve structure in which the spring which normally holds the valve proper against its seat will be subjected to a minimum temperature in service, thus reducing any tendency toward distortion or shortening thereof.

A further object is to provide a valve structure wherein the main valve is exposed or in full view at all times whereby distortion or reduction in the length thereof, while in service, can be readily observed.

A still further object contemplates the provision of a valve assembly having an outlet or outlets of maximum capacity in proportion to the capacity of the valve port, for permitting the escape of steam to atmosphere when said port is open, thereby increasing the efficiency of the valve.

Another object is the provision of a valve structure wherein the valve-seating spring is confined within a retaining member which is provided with comparatively large openings in its side walls for the escape of steam, said openings being formed by a series of circumferentially spaced ribs extending radially from said member and constituting guides for said spring. Preferably, also, said ribs, at one end, overhang the valve seat but are spaced from the valve seat a sufficient distance to accommodate the valve and allow proper movement of said valve under excessive pressures, the overhanging portions of the ribs merely serving as a stop for limiting the opening movement of the valve.

With these and other objects in view, the invention consists in certain details of construction and combinations and arrangements of parts, all as will hereinafter be more fully described, and the novel features thereof particularly pointed out in the appended claims.

In the accompanying drawing—

Figure 1 is a sectional view longitudinally of a valve illustrating the preferred embodiment of the present invention;

Fig. 2 is a top plan view; and

Fig. 3 is a transverse section on the line 3—3 of Fig. 1.

In the structure illustrated, the valve assembly comprises a tubular or ported fitting 10 adapted to be secured directly or indirectly to the boiler with the passage 11 in said member in communication with the interior of the boiler. Removably secured within member 10 is a sleeve 12 having a valve seat 13 formed thereon and a valve 14 yieldingly urged against said seat by a coil spring 15 normally closes the passage 11.

Secured on said tubular member 10 is an annular or band-like member 16 and formed on said band are a plurality of ribs 17. These ribs are relatively thin and extend axially of said members, but are disposed edgewise radially of the band so that their inner edges will confine and guide the spring 15 as the latter is contracted and expanded in service. At their upper ends or those ends remote from band 16, the ribs are connected by a body of metal 18, having a bore for accommodation of the stem 19 of valve 14 and the threaded nut 20 by which the normal compression of spring 15 is regulated. In this way, the band 16, ribs 17 and body 18 constitute a cage-like housing for the spring. This structure permits the maximum amount of strength with the minimum amount of metal between the band 16 and the body 18 with the minimum amount of resistance to the flow of fluid between the connecting ribs 17. Mounted on said housing is a hollow carrier 21 for the hand popping lever 22, the latter being pivoted at 23 in said carrier and engaging a collar 24 on the upper end of valve stem 19 whereby the valve may be manually raised from its seat.

As will be understood, the valve is normally held against its seat by spring 15, but in the event a certain pressure is exceeded within the boiler, the valve will be unseated by the pressure of steam in port 11. The advantage of the cage-like structure of the spring housing, in addition to the ribs functioning as guides for the spring, is that steam emitted by unseating of the valve, has ready access to atmosphere through the comparatively large openings 25 between each pair of ribs. This ready escape of the steam prevents undue heating of the spring and thus prolongs its serviceability. Furthermore, the openings in the spring housing or between the ribs 17 permits a full view of the valve and spring so as to facilitate ready inspection thereof. This is important, as often times operators in the field adjust or take-up on the valve spring to compensate for contraction of the spring because of undue heating thereof by the steam and, ultimately, the spring will be tightened to an extent where the valve cannot be moved or unseated by the steam pressures. When the spring-retaining housing has substantially solid walls, such conduct and the consequent conditions, may prove disastrous because the spring is not open to view.

It will also be observed that the inner surface of band 16 can be made perfectly plain so that it presents no obstruction to steam passing from port 11 to spaces 25 between the ribs 17. The edges of the ribs, at their lower ends, are the only portions of the assembly tending to restrict the flow of steam at this point and, of course, this restriction is negligible. This, and the enlarged openings between the ribs, prevents the building up of back pressures which might otherwise augment the valve-seating action of the spring.

Preferably, the length of band 16 is such that the ends of ribs 17 projecting radially inwardly therefrom are spaced a suitable distance from valve 15 to permit the latter to move a sufficient distance off its seat to function properly under excessive pressures within the boiler. However, these ends of the ribs serve as stops for limiting the unseating movement of the valve and thus insure its return to proper sealing engagement with the valve seat.

As is quite usual in valve structures of the present type, the valve stem is pinned to the valve and spring 15 is interposed between collars 26, 27, on the valve stem with collar 26 engaged by the adjusting nut 20.

What I claim is:

1. A safety valve for steam boilers including a tubular base, a valve seat therein, a valve on said seat having a stem, a cage for said valve including a band adapted to be secured to said base about said valve, an upper guide body for said stem, longitudinal ribs spacing said guide body axially of said band, said ribs being flat and radially positioned with their narrow edges pointing inwardly and outwardly to form maximum lateral passages for escape of fluid, the upper ends of said ribs being secured to said guide body and their lower ends secured to said band and terminating within said band, a spring in said cage to hold said valve resiliently seated.

2. A safety valve for steam boilers including a tubular base, a valve seat therein, a valve on said seat having a stem, a spring to hold said valve normally seated, a cage surrounding said valve and spring comprising an upper guide member for said stem and a lower band secured to said base about said valve, flattened ribs having a greater radial thickness than circumferential width circumferentially spaced about said spring to form maximum lateral passages for the escape of fluid and having their upper ends supporting said guide member axially of said band, their lower ends terminating in said band about said base.

3. In a safety valve, a tubular member having a seat therein, a valve having a stem, a spring yieldingly urging the valve against said seat, a cage including an upper guide body for said stem and a band adapted to be secured to said tubular member about said valve with a plurality of separate flat bars connecting said upper guide body axially of said band, said bars having their wide dimension radiating from center of valve to provide maximum lateral passages for the escape of fluid.

4. In a safety valve, the combination of a tubular member having a seat therein, a valve having a stem, a spring yieldingly urging the valve against said seat, a cage including an upper guide body for said stem and a band adapted to be secured to said tubular member, said cage comprising a plurality of separate bars, whose circumferential dimensions are less than their radial dimensions, supporting said guide body axially of said band to provide maximum lateral passages for the escape of fluid.

5. In a safety valve, a cage comprising a plurality of circumferentially spaced bars, whose radial dimensions exceed their circumferential dimensions whereby maximum lateral passages are provided for the escape of fluid, said bars connecting an upper stem guide portion axially of a lower band about a valve with a stem, said valve having a seat in a tubular member with a spring yieldingly urging said valve toward said seat.

OLLIE L. MULLOY.